July 18, 1961
A. T. FREDRICKS ET AL
2,992,863
DRIVE WHEEL MECHANISM FOR SELF-PROPELLED
SNOW TRAVERSING VEHICLE
Filed Oct. 31, 1958
5 Sheets-Sheet 3
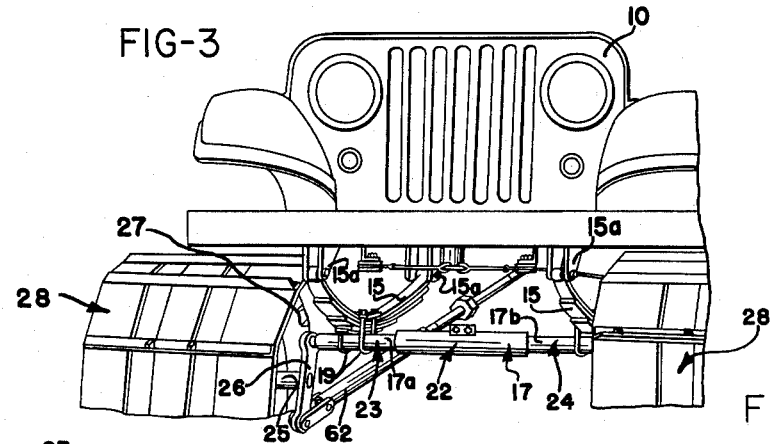
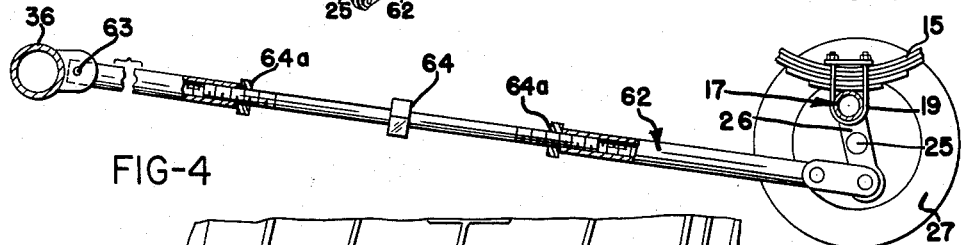
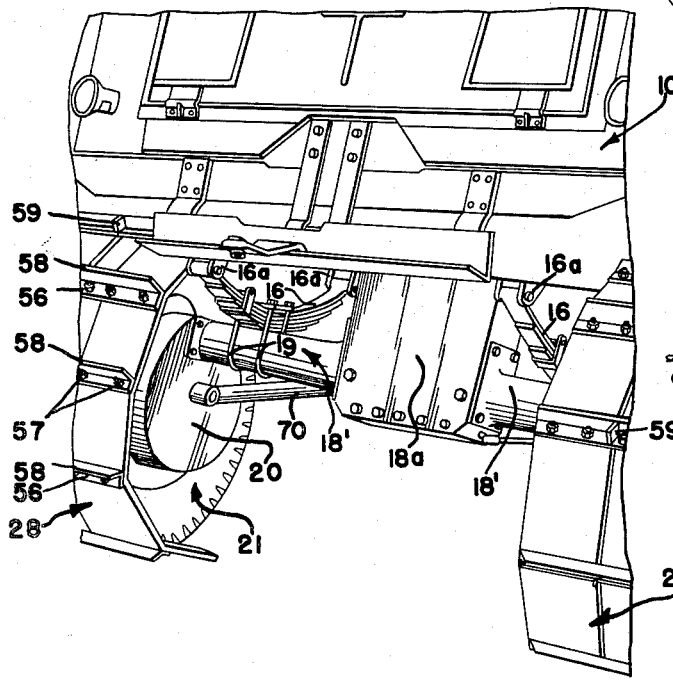
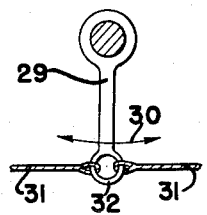
*INVENTORS*
ANTHONY T. FREDRICKS
GEORGE KENNETH STEELE
BY

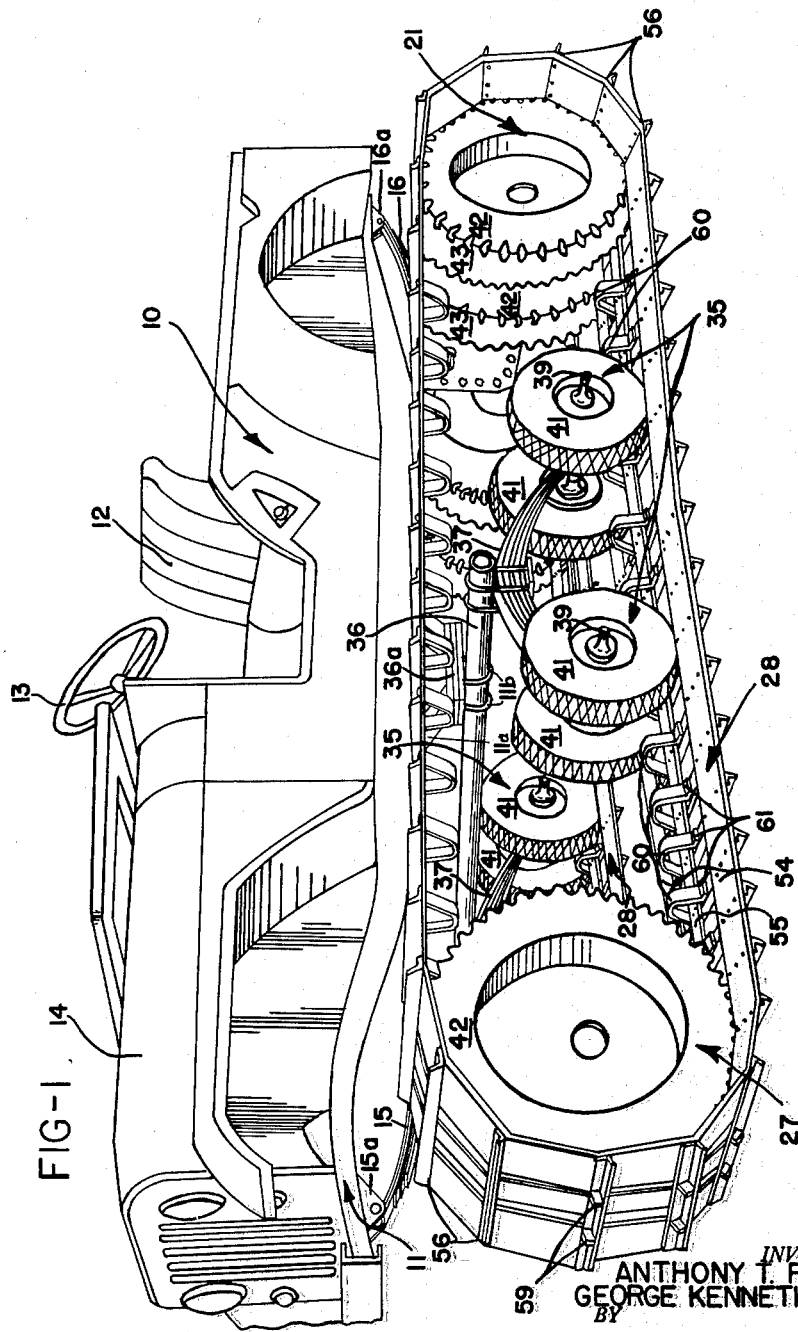

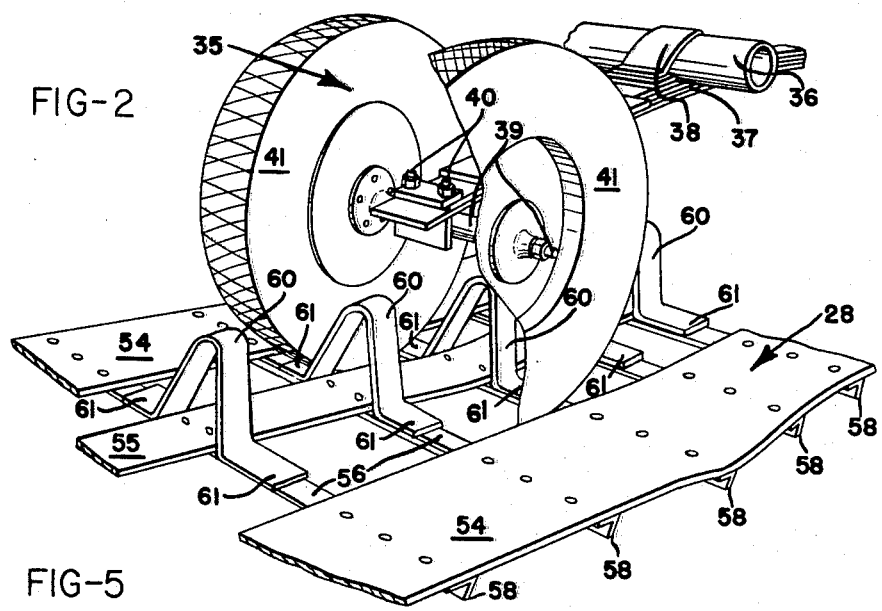
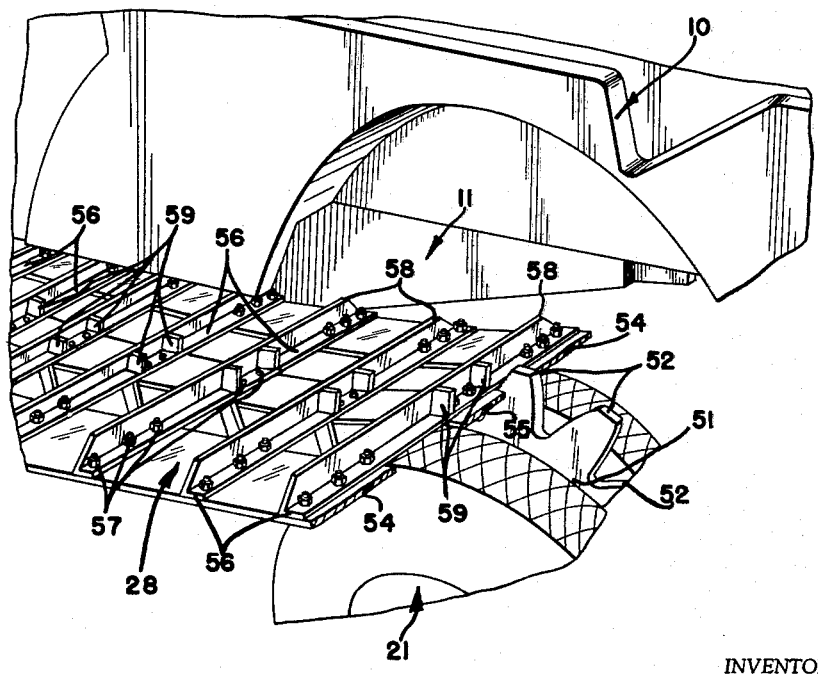

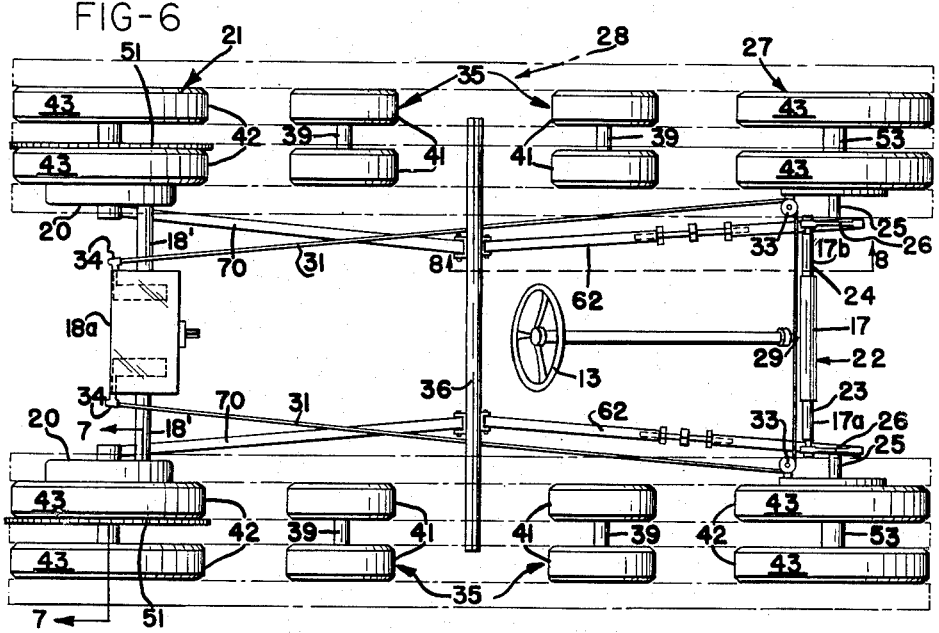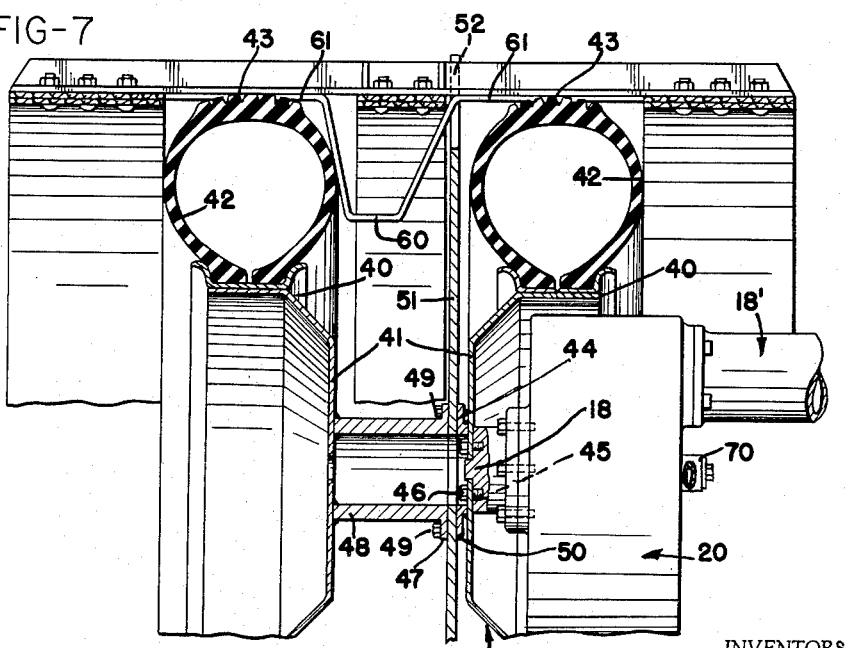

July 18, 1961  A. T. FREDRICKS ET AL  2,992,863
DRIVE WHEEL MECHANISM FOR SELF-PROPELLED
SNOW TRAVERSING VEHICLE
Filed Oct. 31, 1958  5 Sheets-Sheet 5

INVENTORS
ANTHONY T. FREDRICKS
GEORGE KENNETH STEELE
BY

2,992,863
**DRIVE WHEEL MECHANISM FOR SELF-PRO-
PELLED SNOW TRAVERSING VEHICLE**
Anthony T. Fredricks, 25 Horizon Drive, and George
Kenneth Steele, 5103 Fairmont, both of Boise, Idaho
Filed Oct. 31, 1958, Ser. No. 770,991
1 Claim. (Cl. 305—57)

Our present invention relates to self-propelled vehicles of the endless track type and more particularly to such vehicles as are effective for traveling over snow, marshes, and other areas where the density or structure of the supporting surface is such as to render them nearly impassable to most conventional vehicles.

In industries such as those producing and transmitting electricity, telegraph and telephone services, as well as others, and also in the military, it is very often found to be necessary to transport men and supplies over surface areas such as marshes, desert sand, and/or deep snow, wherein the physical characteristic of the supporting surface is not such as to provide sufficient support and traction for conventional wheeled vehicles.

It is desirable to use a vehicle for traversing steep mountainsides either horizontally or vertically when making a survey of snow conditions to calculate the expected water runoff, and also when reseeding mountainous areas after logging operations or fires. Obviously conventional wheeled vehicles are impractical for these purposes and to our knowledge prior to our invention no single vehicle has been effective for all of these specialized functions and uses.

In some instances, such as in sand, it has been found that the substitution of short tracks in the place of the conventional driving wheels is sufficient to provide support and traction for some vehicles. This, however, has not been found practical in deep snow and extremely marshy conditions since the ratio of the weight of the vehicle with respect to track support area has not been heretofore designed in a practical manner. The devices produced for use in sand and marshes, although they have to some degree been accepted, have not been entirely satisfactory. And the efforts thus far promoted with respect to deep snow have been even less satisfactory.

It is therefore a primary object of the present invention to provide a machine having structure which provides a sufficiently light p.s.i. to make it very manueuverable and operable upon soft support surfaces such as deep snow, sand, and marshes, and yet one in which the cost of production is not prohibitive and the speed of movement and cost of operation make the use of the machine very desirable.

To our knowledge, we have produced a machine (which we prefer to call a "Snoball") which has a lighter p.s.i. than any other resilient track type vehicle of equal pulling performance and speed. Our full size pilot model has an overall weight of substantially 3,100 pounds, a pair of ground engaging flights of track each 30 inches wide and substantially 136 inches long. This machine weighs .38 p.s.i. of track surface on the lower ground engaging flight thereof.

Another object of the present invention lies in the provision of a vehicle of the track type for traversing snow and similar surfaces which has a steering wheel similar to the conventional automobile and is very conveniently maneuverable, thus avoiding the laborious use of hand levers conventionally found in track type vehicles in which steering is accomplished by selectively diverting the distribution of power to the separate tracks.

To accomplish the foregoing and other objects, we have provided improved structure wherein the control of the tracks is effected by means of a conventional steering wheel and thus renders this operation of the machine as simple as driving a conventional automobile.

We have also provided for the improved tracks cooperating wheels specifically designed to support the light weight tracks and impart power to them.

Further, we have devised a unique means for tensioning the tracks by adjustably positioning the spindles of the idler wheels longitudinally of the vehicle in parallelism to the power or driving axle.

The foregoing objects and advantages, in addition to others, will be clearly seen by reading the following specification when considered in conjunction with the accompanying drawings.

In said drawings, wherein like numerals are employed to designate similar parts:

FIGURE 1 is a perspective view of our improved track type vehicle with parts broken away for convenience of illustration;

FIGURE 2 is a fragmentary perspective view of a set of wheels of one bogie truck disposed in relationship to the ground engaging flight of an endless track;

FIGURE 3 is a front fragmentary perspective view showing the front axle, spring suspension, and the means for tensioning the tracks;

FIGURE 4 is a rear fragmentary perspective view showing the spring suspension of the frame on the rear axle housing;

FIGURE 5 is a fragmentary perspective view showing a portion of the rear track-driving wheel with a portion of the track associated therewith;

FIGURE 6 is a diagrammatic view in plan showing the steering control mechanisms, the track tensioning devices, and support wheels;

FIGURE 7 is a fragmentary vertical cross section taken substantially on the plane indicated by the line 7—7 of FIGURE 6;

FIGURE 8 is a fragmentary view showing the track tensioning mechanism taken substantially on the plane indicated by line 8—8 of FIGURE 6 and having parts removed for convenience of illustration;

FIGURE 9 is a view showing the pitman arm to which is secured the flexible cable constituting lost motion connectors;

Figure 10:
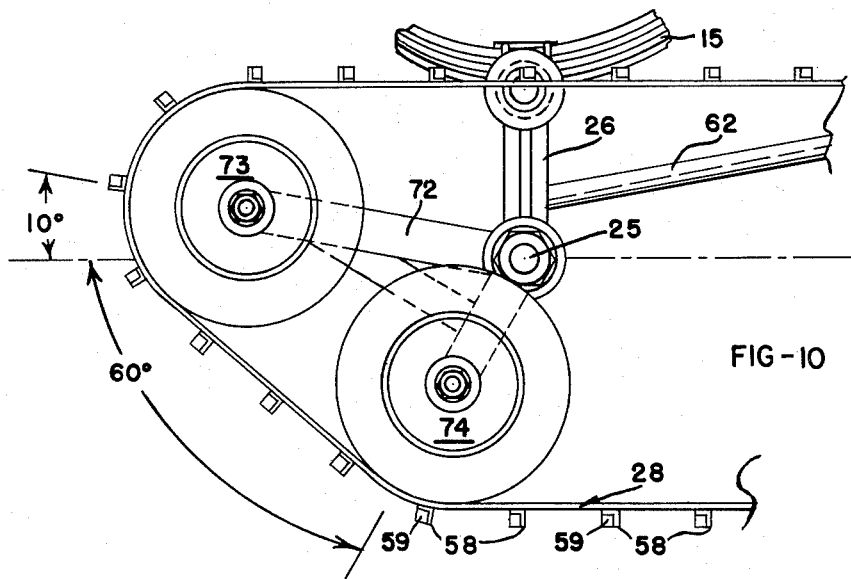
FIGURE 10 is a side elevation of a modified front track-support member.

Referring now more particularly to the drawing, we have shown a vehicle which we prefer to term a "Snoball," which briefly comprises a body 10 supported by a frame, one member of which is seen at 11. It will be understood that the body and frame may have any shape and size desired for the practice of the invention.

The body is seen to be provided with a conventional bucket type seat 12 upon which the operator may sit in position to easily operate the vehicle by means of the conventional steering wheel 13 and the other conventional pedals and gearshift levers (not shown). It will be understood that under the hood 14 or at some other convenient location, the frame 11 supports a source of rotary power such as an internal combustion gasoline or diesel engine (not shown).

As seen more particularly in FIGURES 3 and 4, the frame is supported on conventional front and rear leaf springs 15 and 16, which are secured to the frame by means of shackles 15a and 16a respectively at their ends and are secured to the front axle 17 and the housing 18' of the rear axle 18 by means of clevises such as seen at 19. At its ends the rear axle housing 18' supports depending bull gear housings 20 within each of which is contained a conventional driving mechanism for rotating the driving wheels 21. It will thus be seen that the clearance under the differential housing 18a of the rear axle housing 18' is appreciably greater than under a conventional vehicle where the axle shafts and housings are disposed at the axis of the wheels.

Attention is also directed to FIGURE 3 where it is seen that the front axle 17 is sectional, having a central section 22, and left and right end sections 23 and 24. It will be noted that the end sections 23 and 24 are substantially similar to bell cranks, that is, the axle portions 17a and 17b are axially offset with respect to their spindles or journals 25. The spindles or journals may be secured in axial offset relationship to the axle section 17a by means of radially disposed throw arms 26, as more particularly seen in FIGURES 3 and 8.

The front idler wheels 27 are journaled for rotation on the spindles or journals 25, and it will be seen that no provision has been made for steering movement of either the front wheels or the rear wheels. The axles 17 and 18 extend laterally of the frame and parallel to each other and carry pairs of front wheels 27 and rear wheels 21 with sets of said front and rear wheels at each side of the vehicle in coincident vertical longitudinal planes.

Trained about these coincident sets of wheels we provide endless tracks 28 as more particularly seen in FIGURE 1 of the drawing. The tracks are positively driven by the sprockets 51 and are frictionally engaged with the periphery of the rear wheels which are driven by the rear axles 18 operably connected to the hereinbefore mentioned source of power carried by the frame 11.

The steering wheel 13 is provided with a conventional steering gear box (not shown) and may or may not be provided with the conventional power assist mechanism to effect swinging movement of the pitman rod 29 alternately in opposed directions indicated by the arrow 30. Cables 31 or other well known lost motion linkage are secured in the eye 32 of the pitman rod and extend about sheave 33 carried by the frame of the vehicle and rearwardly to the operating arms 34 of the steering differential (not shown) contained in the housing 18a. It will be understood that this steering differential includes operating braking bands for diverting the rotary motion selectively to the driving axles. This structure in itself constitutes no part of the present invention, but is a part necessary to the proper functioning of the device.

It will thus be seen that as the steering wheel 13 is rotated in one direction, one cable 31 will be tautened while the other is slackened, and the tautened cable will effect movement of the arm 34 to which it is connected and in turn will cause the steering differential mechanism to operate to divert a greater portion of the power flow to the desired driving axle. In this manner there is a continuous but variable power flow to both driving axles, and the steering movements of the track-type vehicle may be controlled by a conventional steering wheel, thus obviating the necessity of the levers which to our knowledge are exclusively employed.

To distribute the weight of the machine over the ground-engaging flight of the tracks 28, we provide bogie trucks 35 which have rubber-tired wheels secured in tandem and disposed to roll upon the inner surface of the ground-engaging flight of the tracks 28. It will be noted that a support beam 36 extends laterally of the frame 11 intermediate the front and rear axles 17 and 18. The frame 11 has depending supports 11a to which the support beam 36 is secured at vertical adjustable positions by U-bolts 11b. On the end portions of said support beam 36 longitudinally extending leaf springs 37 are secured intermediate their lengths by pivotal sleeves and collars indicated at 38. At the extreme ends of the springs 37, laterally extending axles 39 are releasably secured as by bolts 40, and on the end portions of the axles are journaled the pneumatic-tired wheels 41.

The axles 39 are disposed in a position relative to the axis of the front and rear axles 17 and 18 so that when the vehicle is raised from the supporting surface, a horizontal plane common to the under tire face of tires suspended from axles 39 is disposed substantially 3 inches below a horizontal plane common to the under tire faces of wheels 21 and 27. The tensions of the springs 37 support substantially 90 percent of the weight of the vehicle on the bogie trucks 37.

A greater portion of the vehicle weight is supported on the bogie trucks 35 which results in greater ease of turning. This is less critical on soft surfaces such as light fluffy snow than on hard compacted surfaces, but there should always be somewhat more than 50 percent of the weight born by the bogies. The distribution of weight may be varied by inserting or removing shims 36a which effectively position the support beam 36 for this purpose.

Referring now in greater detail to FIGURE 7, it will be seen that the rear driving wheels each comprise a pair of spaced concentric rims 40 to which are secured in conventional manner the wheel discs 41. Pneumatic tires 42 are carried by the rims and have their peripheral tread faces 43 disposed equidistant from the axis of the wheel 21. The inner wheel-disc 41 or that one nearest the frame 11 of the vehicle is provided with a radially disposed flange 44 welded or otherwise secured to the disc 41 in encircling relation to the wheel mounting apertures 45 through which the lug bolts 46 pass to secure the wheel to the rear axle 18. A similar flange 47 is mounted to the disc 41 of the outer rim 40 by means of an elongated cylindrical member 48 and bolts 49 are adapted to pass through the flange 47 and thread into internally threaded apertures 50 of the flange 44 for the purpose of securing the rims 40 relative to each other.

Intermediate the flanges 44 and 47, we provide a rigid sprocket 51 which it will be seen is disposed adjacent to the outer marginal side of the inner tire 42, and is provided with teeth or projections 52 spaced about its periphery, as more conveniently seen in FIGURE 5.

The front wheels 27 are similarly constructed, omitting the sprockets 51, or are suspended from a spider 72, hereinafter more particularly described, and the length of the cylindrical extensions 53 or axles is such to position the front tires 42 in alignment with the coincident back tires 42.

The tracks 28 are comprised of a plurality of endless flexible belts 54 and 55, with the marginal belts 54 being appreciably wider than the center belt 55. For practical reasons, we use rubber impregnated fabric belting material, i.e., transmission belting, and couple the free ends with conventional belt splicers to make endless belts therefrom. It will be understood, however, that other types of flat flexible belts may be employed and are comprehended in this disclosure.

In actual practice, on the pilot model, the marginal belts 54 are 7" wide while the center belt 55 is 4" wide with a spacing of approximately 6" between the marginal belts and the center belt.

Multiple angular cleats 56 extend laterally of the belts and are secured to their outer faces by means of rivets or bolts 57 as shown. The cleats 56 are provided with upstanding or radially disposed flanges 58 which provide traction for the tracks and also stiffen the tracks laterally since the cleats 56 are rigid and thus distribute the weight on the tracks equally across the width thereof on the ground-engaging flight. It will be understood that the spacing of the cleats 56 is coincident to the spacing of the projections 52 of the sprockets 51 carried by the rear wheels, and the projections 52 act as teeth which pass intermediate the cleats 56 similar to a sprocket and chain, and thus impart positive movement to the tracks from rotation of the rear wheels 21. It will also be noted that the spacing between the belts 54 and 55, which is bridged by the cleats 56, form reticulate openings therebetween, the purpose of which is to provide openings through which the snow may be forced outwardly by the tire surfaces 43, and thus there is no danger of snow or other material becoming impacted between the tracks 28 and their driving wheels 21 or idler wheels 27, a fatal defect of prior constructions for this purpose.

The angle cleats 56 are each reinforced by one or more square metal fillets 59 which are welded into the angle defined by the cleat flanges 58. The fillets 59 serve the additional purpose of providing traction against side slippage so that the vehicle may satisfactorily sidehill. These fillets are positioned on the cleats 56, coincidentally, and collectively constitute one or more parallel broken circumferential ribs on the traction side of the tracks 28.

To maintain the tracks 28 on the vehicle, we provide inwardly disposed projections or guides 60 which preferably are formed from strap metal bent so that the end portions 61 are disposed in face-to-face engagement with the inner flanges of the cleats 56 and are secured thereto as by welding. As particularly seen in FIGURE 7, these projections 60 extend inwardly between the several dual tires and provide means for guiding and holding the track in place.

Since belting material of the type employed may have a tendency to stretch slightly on continued use, it is desirable to provide means for properly tensioning the tracks. Also, it is necessary to provide means for installing and removing the tracks. We therefore have provided means for so doing, shown particularly in FIGURES 3 and 8 of the drawing. As hereinbefore defined, the spindles 25 of the front wheel axle assemblies 23 and 24 are axially offset from the axis of the front axle portions 17a and 17b. It will thus be seen that the axle assemblies 23 and 24 may pivot about the axis defined by the axle portions 17a and 17b independently of each other.

The arms 26 are pivotally secured to brace bars 62 which are bifurcated to receive the lower end portions of said arms. The bars 62 have their opposed ends pivotally connected at 63 to the support beam 36. The brace bars 62 include means for expanding and contracting the length of the bars such as turnbuckle 64 secured at selected adjusted positions by lock nuts 64a, and therefore it will be seen that by operation of the turnbuckles 64 the length of the brace bars 62 may be varied to pivot the axle assemblies 23 and 24 about their common axis to move the spindles 25 forwardly or rearwardly with respect to the frame 11, and thus toward or away from the rear wheels 21 whereby the tracks 28 may be slackened and removed, or installed and properly tensioned.

It will be noted that the rear differential housing and wheel assemblies are also braced by rigid brace bars 70 pivotally secured to the bull gear housing and the support beam 36.

In FIGURE 10 we have shown a modified front track support idler which consists of rigid spiders 72 journaled on the spindles 25 and replacing the wheels 27. The spider is provided with a front idler wheel 73 which is disposed with its circumference tangential to the upper flight of the track 28, and a second idler wheel 74 disposed rearwardly of the wheel 73 and with its circumference tangential to the ground engaging flight of the track 28. It will be understood that the wheels 73 and 74 are preferably provided with pneumatic tires and are dual in form so that each tire is disposed coincident to the plane of one of the tires 42 of the rear wheel 21.

Figure 11:
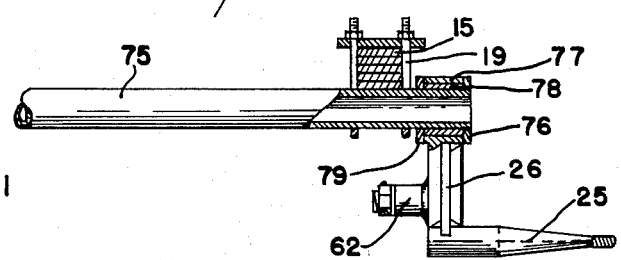
FIGURE 11 is a fragmentary detail of a modified front axle.
Figure 12:
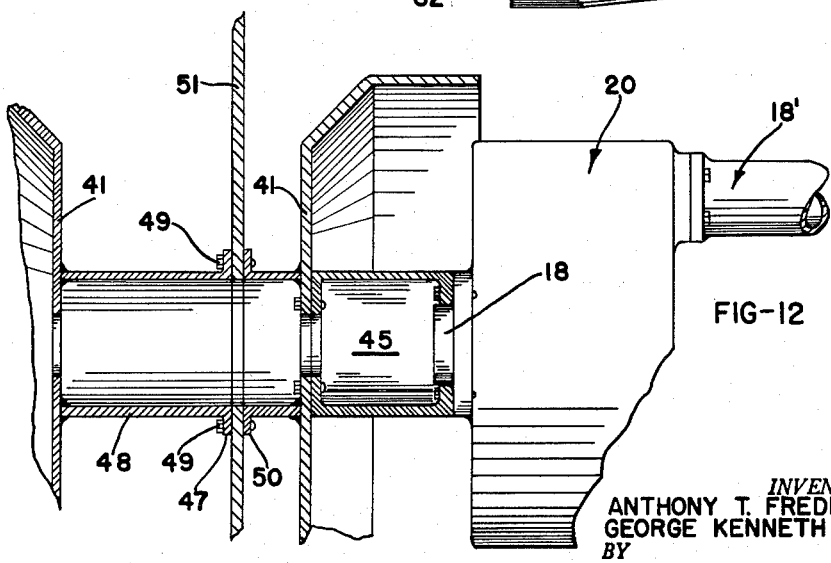
FIGURE 12 is an enlarged rear wheel detail.

In FIGURE 11 of the drawing, we have shown a modified front axle, and this structure includes a laterally extending tubular axle shaft 75 which is rigidly secured to and supported by the springs 15. At its ends the axle shaft 75 is provided with external threads upon which an annular flange 76 is threadedly engaged. The radial throw arms 26 are then provided with cylindrical housings 77 at their upper ends, within which are disposed bushings 78 which support the throw arms on the end portions of the axle shaft 75 for pivotal movement. A washer 79 encircles the shaft 75 to position the throw arm 26.

Having thus defined our invention, we claim as new and desire to secure by Letters Patent of the United States the following:

A drive wheel for relatively light weight snow-traversing vehicles of the character described comprising spaced parallel tire-receiving rims carried by supporting discs, pneumatic tires on said rims and having their peripheral faces disposed circumferentially equidistant from the axes of said rims; a rigid planar sprocket disposed intermediate said rims and having peripheral projections which extend radially beyond the peripheral faces of said tires; a concentric flange on one said disc; an elongated cylindrical member on the other said disc and having a flange companion to said first-named flange; means clamping said sprocket between said flanges; and means for securing said wheel to a drive axle.

References Cited in the file of this patent

UNITED STATES PATENTS

| | | |
|---|---|---|
| 1,199,503 | Shaw | Sept. 26, 1916 |
| 1,862,770 | Sargent | June 14, 1932 |
| 1,980,849 | Christie | Nov. 13, 1934 |
| 2,110,587 | Bennet | Mar. 8, 1938 |
| 2,139,070 | Dobbins | Dec. 6, 1938 |
| 2,271,061 | Castillo | Jan. 27, 1942 |
| 2,338,818 | Mayne | Jan. 11, 1944 |
| 2,544,985 | Drakely et al. | Mar. 13, 1951 |
| 2,728,611 | Brauss | Dec. 27, 1955 |
| 2,893,787 | Nodwell | July 7, 1959 |

FOREIGN PATENTS

| | | |
|---|---|---|
| 705,165 | Germany | Apr. 18, 1941 |
| 161,415 | Sweden | Nov. 19, 1957 |